US012664834B2

(12) United States Patent
Martinez et al.

(10) Patent No.: US 12,664,834 B2
(45) Date of Patent: Jun. 23, 2026

(54) METHOD FOR THE ELECTRONIC DIAGNOSIS OF AN ELECTRIC DRIVETRAIN FOR A MOTOR VEHICLE

(71) Applicant: Vitesco Technologies GmbH, Regensburg (DE)

(72) Inventors: Nicolas Martinez, Caragoudes (FR); Jean-Luc Boyer, Tournefeuille (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 78 days.

(21) Appl. No.: 18/838,289

(22) PCT Filed: Mar. 28, 2023

(86) PCT No.: PCT/EP2023/057896
§ 371 (c)(1),
(2) Date: Aug. 14, 2024

(87) PCT Pub. No.: WO2023/186845
PCT Pub. Date: Oct. 5, 2023

(65) Prior Publication Data
US 2025/0148845 A1      May 8, 2025

(30) Foreign Application Priority Data
Mar. 31, 2022      (FR) ...................................... 2202911

(51) Int. Cl.
*G07C 5/08*            (2006.01)
*B60C 19/00*           (2006.01)

(52) U.S. Cl.
CPC ............ *G07C 5/0808* (2013.01); *B60C 19/00* (2013.01); *B60C 2019/004* (2013.01)

(58) Field of Classification Search
CPC .................................................. G07C 5/0808
See application file for complete search history.

(56) References Cited

U.S. PATENT DOCUMENTS

| | | | |
|---|---|---|---|
| 6,563,230 B2 * | 5/2003 | Nada | F02D 31/002 |
| | | | 290/40 C |
| 6,763,622 B2 * | 7/2004 | Schulz | H02P 6/185 |
| | | | 318/807 |

(Continued)

FOREIGN PATENT DOCUMENTS

| | | |
|---|---|---|
| CN | 110208721 A | 9/2019 |
| RU | 2748781 C1 | 5/2021 |
| WO | 2018050992 A1 | 3/2018 |

OTHER PUBLICATIONS

International Search Report (PCT/ISA/210) and Written Opinion (PCT/ISA/237) mailed on Jun. 28, 2023 by the European Patent Office as the International Searching Authority for International Application No. PCT/EP2023/057896. (21 pages).

*Primary Examiner* — Michael A Berns
(74) *Attorney, Agent, or Firm* — Buchanan Ingersoll & Rooney PC

(57)            ABSTRACT

A method for electronically diagnosing an electric drive chain for an electric or hybrid motor vehicle. The drive chain including an electric battery, an electric machine, an inverter connected between the battery and the electric machine, and a link capacitor connected in parallel between the battery and the inverter. The diagnosis method includes: i) continuously controlling the increase in the control frequency of the electric machine; ii) determining the variation in the Fourier transform of the current variation between the assembly comprising the battery and the link capacitor and between the inverter; iii) for each control frequency: 1) detecting an anomaly; 2) otherwise, determining when the control frequency value is optimal.

9 Claims, 2 Drawing Sheets

(56)     References Cited

U.S. PATENT DOCUMENTS

| | | | |
|---|---|---|---|
| 10,505,439 B2 * | 12/2019 | Götz | .......................... B60L 3/12 |
| 11,772,475 B2 | 10/2023 | Boyer et al. | |
| 2001/0048226 A1 | 12/2001 | Nada | |
| 2019/0106002 A1 | 4/2019 | Götz et al. | |
| 2025/0148845 A1 * | 5/2025 | Martinez | .............. G07C 5/0808 |

* cited by examiner detect environmental conditions — E0 detect when the speed of the vehicle is substantially constant — E1 continuously control increase in control frequency — E2 continuously measure value of the current — E3 determine Fourier transform — E4 detect an anomaly — E5 issue warning of anomaly — E5' determine optimal control frequency — E6 reset time counter — E7

METHOD FOR THE ELECTRONIC DIAGNOSIS OF AN ELECTRIC DRIVETRAIN FOR A MOTOR VEHICLE

CROSS REFERENCE TO RELATED APPLICATIONS

This application is the U.S. National Phase Application of PCT International Application No. PCT/EP2023/057896, filed Mar. 28, 2023, which claims priority to French Application No. 2202911, filed Mar. 31, 2022, the contents of such applications being incorporated by reference herein.

FIELD OF THE INVENTION

The invention relates to the field of electric or hybrid vehicles, and more specifically to a diagnostic method for an inverter of a hybrid or electric vehicle.

BACKGROUND OF THE INVENTION

In a known manner, a hybrid vehicle comprises a battery, an electric machine and an internal combustion engine. The electric machine is able to operate according to two operating modes: an engine operating mode, in which the electric machine converts electrical energy supplied by the battery into mechanical energy in order to start the internal combustion engine, and a generator operating mode, in which the electric machine converts the mechanical rotational energy of the internal combustion engine into electrical energy stored in the battery.

Notably, the electric machine and the battery allow the electrical network of the vehicle to be supplied with electrical energy in order to supply direct voltage to various items of equipment of the vehicle.

In the case of a three-phase electric machine, the electric machine commonly comprises three coils.

In order to control the electric machine, an inverter is connected between the battery and the electric machine. In the present case, the inverter is able to generate three alternating currents, phase shifted relative to each other, from the voltage supplied by the battery. Each generated alternating current can be used to supply a coil of the electric machine.

In order to generate the three alternating currents, the inverter comprises three power levels. Each power level comprises a first MOSFET transistor, called "high" transistor since its drain is connected to the battery, and a second MOSFET transistor, called "low" transistor since its source is connected to ground. The drain of the low transistor is connected to the source of the high transistor. The current for supplying the corresponding coil of the electric machine is generated at the midpoint connecting the two transistors. The transistors used also can be of the insulated-gate bipolar type.

However, each element of the drive chain wears. For example, each transistor, which is intended to switch many times, experiences switching losses. A malfunction of a transistor could cause the inverter to malfunction. In order to detect a malfunction in the inverter, it is known for the voltage to be measured between the drain and the source of each MOSFET transistor and for the measured values to be compared with reference values. The voltage between the drain and the source represents the residual resistance of the MOSFET transistor. Indeed, a gated transistor has very high residual resistance.

In addition, worn elements can also cause noise that disturbs the user of the vehicle and increases the electrical energy consumption of the vehicle. This is the case, for example, for the input inductance, designating the EMC (ElectroMagnetic Compatibility) filter, connected to the input of the inverter.

Therefore, a requirement exists for a solution for at least partially overcoming the disadvantages described above.

SUMMARY OF THE INVENTION

To this end, an aspect of the invention relates to a method for electronically diagnosing an electric drive chain for an electric or hybrid motor vehicle, the drive chain comprising an electric battery, an electric machine, an inverter connected between the battery and the electric machine, and a link capacitor connected in parallel between the battery and the inverter, the diagnosis method comprising the following steps of:

i) continuously controlling the increase in the control frequency of the electric machine from a minimum value to a maximum value;

ii) continuously measuring the value of the current between the assembly comprising the battery and the link capacitor and between the inverter during the control step;

iii) determining the variation in the Fourier transform of the received current variation as a function of the control frequency;

iv) for each control frequency:

1) detecting an anomaly if at least one value of the Fourier transform is outside a predefined Fourier transform interval for said control frequency;

2) otherwise, determining when said control frequency value is optimal if the value of the Fourier transform for said control frequency is below a predefined threshold.

Thus, the method allows an anomaly to be detected, allowing a malfunction anomaly of the inverter to be indicated, from the measurement of the current variation during the variation in the control frequency of the electric machine and from the Fourier transform of the current variation thus measured. In addition, the method also allows at least one optimal control frequency to be determined, allowing efficient and optimal operation of the electric machine to be achieved.

Preferably, the method comprises, before the step of controlling the increase in the control frequency, a step of detecting when the speed of the vehicle is substantially constant.

More preferably, the method comprises a preliminary phase of detecting the environmental conditions that allow the method described herein to be implemented.

More preferably, the minimum value of the control frequency ranges between 18.0 and 19.5 KHz and the maximum value of the control frequency ranges between 20.5 and 22.0 KHz.

Advantageously, the electric machine comprises at least two coils, the inverter comprises at least two power circuits, each power circuit comprises a first switch, called "high" switch, connected between the battery and a midpoint specific to said power circuit, and a second switch, called "low" switch, connected between the midpoint and ground, each power circuit being able to supply an alternating current at its midpoint, each power circuit being connected to a coil of the electric machine via its midpoint, each high switch and each low switch is characterized by a switching frequency, the step of controlling the control frequency of the electric machine designating the step of controlling the switching frequency of the switches of each power circuit of the inverter.

An aspect of the invention also relates to a computer program product that is noteworthy in that it comprises a set of program code instructions, which, when they are executed by one or more processors, configure the one or more processors to implement a method as described above.

An aspect of the invention also relates to a control unit for an electric drive chain for an electric or hybrid motor vehicle, the drive chain comprising an electric battery, an electric machine, an inverter connected between the battery and the electric machine, and a link capacitor connected in parallel between the battery and the inverter, the control unit being able to implement the method as described above.

Preferably, the electric machine comprises at least three coils, the inverter comprises at least two power circuits, each power circuit comprises a first switch, called "high" switch, connected between the battery and a midpoint specific to said power circuit, and a second switch, called "low" switch, connected between the midpoint and ground, each power circuit being able to supply an alternating current at its midpoint, each power circuit is connected to a coil of the electric machine via its midpoint, each high switch and each low switch is characterized by a switching frequency, the control unit being able to implement the method as described above.

An aspect of the invention also relates to a motor vehicle comprising an electric drive chain, the drive chain comprising an electric battery, an electric machine, an inverter connected between the battery and the electric machine, a link capacitor connected in parallel between the battery and the inverter, and a control unit as described above.

BRIEF DESCRIPTION OF THE DRAWINGS

Further features and advantages of aspects of the invention will become more clearly apparent upon reading the following description. The description is purely illustrative and must be read with reference to the appended drawings, in which.

DETAILED DESCRIPTION OF EXEMPLARY EMBODIMENTS

Vehicle

Figure 1:
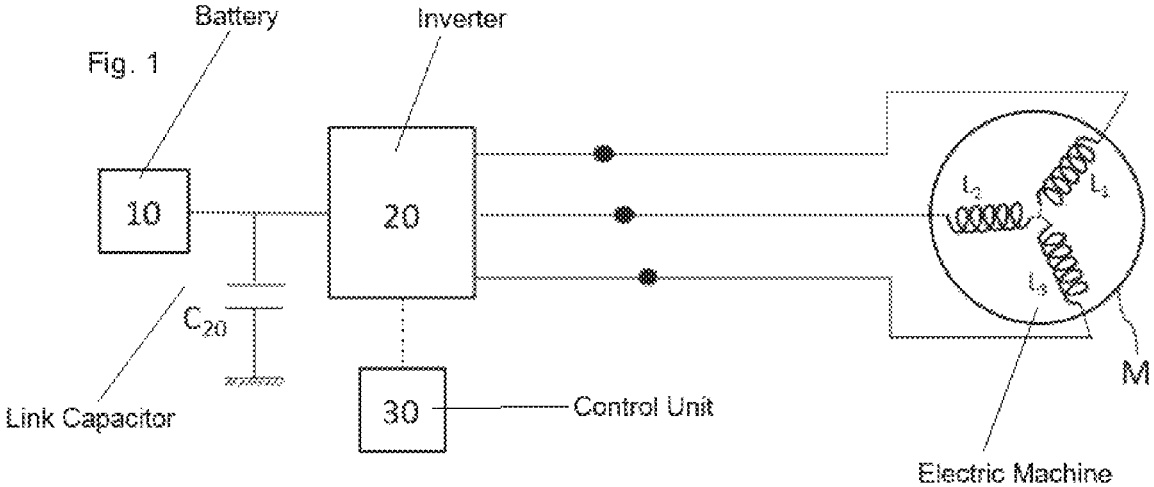
FIG. 1 is a schematic view of an electric drive chain of an electric or hybrid vehicle according to an aspect of the invention.

An embodiment of an electric drive chain for an electric or hybrid vehicle according to the invention will now be described. With reference to FIG. 1, the drive chain comprises a battery 10, an electric machine M, an inverter 20, a control unit 30 of the inverter 20 and a link capacitor $C_{20}$.

The battery 10 is able to supply a direct voltage in order to supply electrical energy to various items of equipment mounted in the vehicle. In the present case, the battery is notably able to supply power to the electric machine M.

The electric machine M notably designates a permanent magnet electric motor when the vehicle is electric or an electric motor more commonly called alternator-starter or BSG "Belt Starter Generator" by a person skilled in the art when the vehicle is hybrid.

Electric Machine M

The electric machine M is able to operate according to two operating modes: an engine operating mode, in which the electric machine M converts electrical energy into mechanical energy, and a generator operating mode, in which the electric machine M converts mechanical energy into electrical energy stored in the battery 10. For example, if the vehicle is hybrid, then, according to the engine operating mode, the electric machine M converts electrical energy into mechanical energy in order to start the internal combustion engine, and, according to the generator operating mode, the electric machine M converts the mechanical rotational energy of the internal combustion engine into electrical energy stored in the battery 10.

Usually, an electric machine M comprises at least two phases and a number of coils that is identical to the number of phases. In the example described hereafter, the electric machine M is a three-phase machine and comprises three coils L1, L2, L3.

Inverter 20

The inverter 20 is connected between the battery 10 and the electric machine M in order to control the electric machine M.

The inverter 20 is able to generate at least one alternating current from the voltage supplied by the battery 10. Each alternating current generated by the inverter 20 allows a coil L1, L2, L3 of the electric machine M to be powered. Thus, since the electric machine M comprises three coils L1, L2, L3, the inverter 20 is able to generate three alternating currents, that are phase shifted relative to each other.

The control unit 30 is able to control the inverter 20, in order to define the conversion of the voltage between the battery 10 and the electric machine M.

Figure 2:
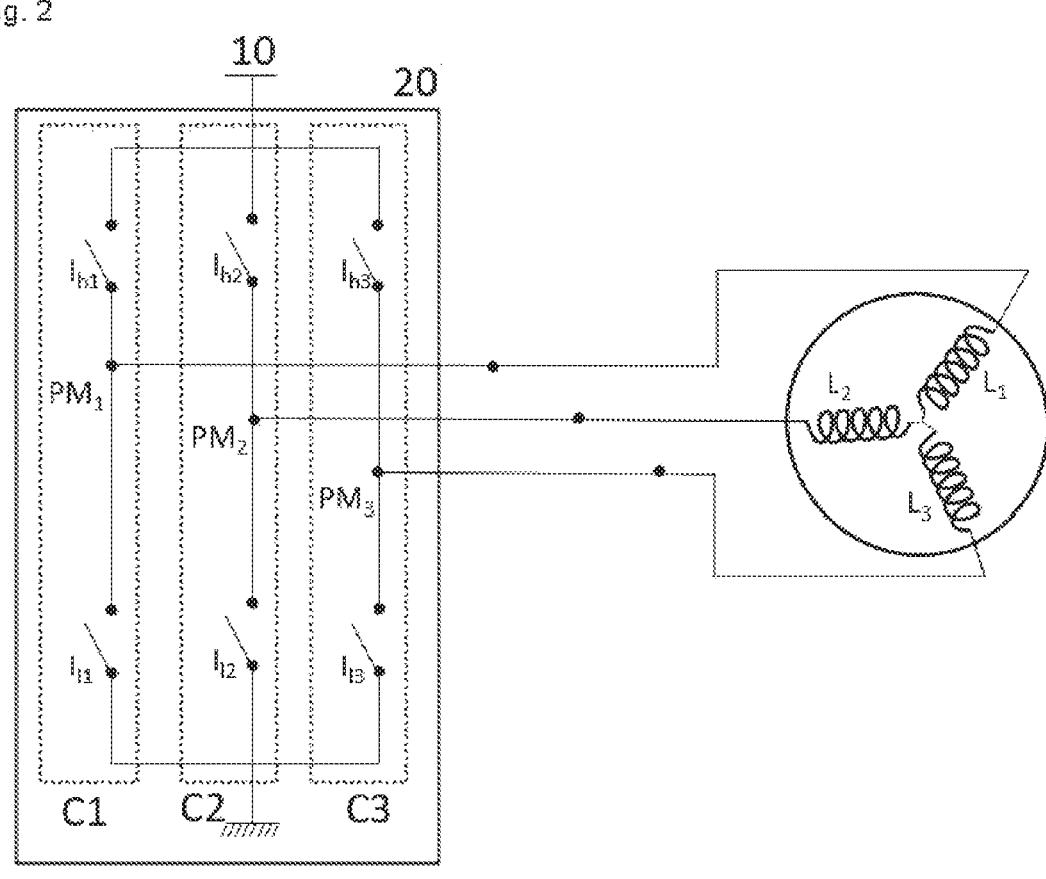
FIG. 2 is a detailed illustration of an inverter and of an electric machine according to FIG. 1.

The detailed structure of the inverter 20 is described with reference to FIG. 2.

In order to generate each alternating current, the inverter 20 comprises a circuit, called "power" circuit. According to the example described herein, the inverter 20 is able to generate three phase-shifted alternating currents for powering the electric machine M and the inverter 20 therefore comprises three power circuits C1, C2, C3.

Each power circuit C1, C2, C3 comprises a first switch $I_{h1}, I_{h2}, I_{h3}$, called "high" switch, and a second switch $I_{l1}, I_{l2}, I_{l3}$, called "low" switch.

The first switch $I_{h1}, I_{h2}, I_{h3}$ of each power circuit C1, C2, C3 is connected between the battery 10 and a midpoint PM1, PM2, PM3 specific to said power circuit C1, C2, C3.

The second switch $I_{h1}, I_{h2}, I_{h3}$ of each power circuit C1, C2, C3 is connected between the midpoint PM1, PM2, PM3 specific to said power circuit C1, C2, C3 and ground.

Thus, for each power circuit C1, C2, C3, the first switch $I_{h1}, I_{h2}, I_{h3}$ and the second switch $I_{l1}, I_{l2}, I_{l3}$ are connected to each other via the midpoint PM1, PM2, PM3 specific to said power circuit C1, C2, C3.

Each power circuit C1, C2, C3 thus generates an alternating current at its midpoint PM1, PM2, PM3.

Thus, the midpoint PM1 of the first power circuit C1 is connected to the first coil L1 of the electric machine M, the second midpoint PM2 of the second power circuit C2 is connected to the second coil L2, and the third midpoint PM3 of the third power circuit C3 is connected to the third coil L3.

Preferably, each switch $I_{h1}, I_{h2}, I_{h3}, I_{l1}, I_{l2}, I_{l3}$ is a transistor, for example, of the MOSFET or Insulated-Gate Bipolar Transistor (IGBT) type. According to the described example, the switches are of the MOSFET type.

Each high switch $I_{h1}$, $I_{h2}$, $I_{h3}$ and each low switch $I_{l1}$, $I_{l2}$, $I_{l3}$ is characterized by a switching frequency, in other words, by an opening and closing frequency. Each high switch $I_{h1}$, $I_{h2}$, $I_{h3}$ and each low switch $I_{l1}$, $I_{l2}$, $I_{l3}$ is also characterized by a duty cycle defining the opening duration relative to the closing duration of said switch.

The control unit 30 of the inverter 20 is able to control the opening and closing of each high switch $I_{h1}$, $I_{h2}$, $I_{h3}$ and of each low switch $I_{l1}$, $I_{l2}$, $I_{l3}$ as a function of the amplitude and the frequency of the alternating currents to be supplied.

More specifically, the control unit 30 is configured to control the variation in the switching frequency and the variation in the duty cycle characterizing each high switch $I_{h1}$, $I_{h2}$, $I_{h3}$ and each low switch $I_{l1}$, $I_{l2}$, $I_{l3}$.

In addition, the control unit 30 comprises a memory zone that stores a time counter.

Link Capacitor $C_{20}$

The link capacitor $C_{20}$ is also mounted in parallel between the battery 10 and the inverter 20. In other words, the capacitor $C_{20}$ is connected, on the one hand, between the battery 10 and the inverter 20 and, on the other hand, to ground.

The link capacitor $C_{20}$ is able to suppress any residual oscillations of a voltage supplied between the battery 10 and the inverter 20, notably so as not to damage the battery 10. Moreover, when closing each high switch $I_{h1}$, $I_{h2}$, $I_{h3}$ and each low switch $I_{l1}$, $I_{l2}$, $I_{l3}$, this creates a current draw in said switch. Conversely, the current in said switch $I_{h1}$, $I_{h2}$, $I_{h3}$, $I_{l1}$, $I_{l2}$, $I_{l3}$ decreases or is canceled out when said switch is open. The link capacitor $C_{20}$ thus allows the variations in current to be compensated in order to protect the battery 10.

Method

Figure 3:
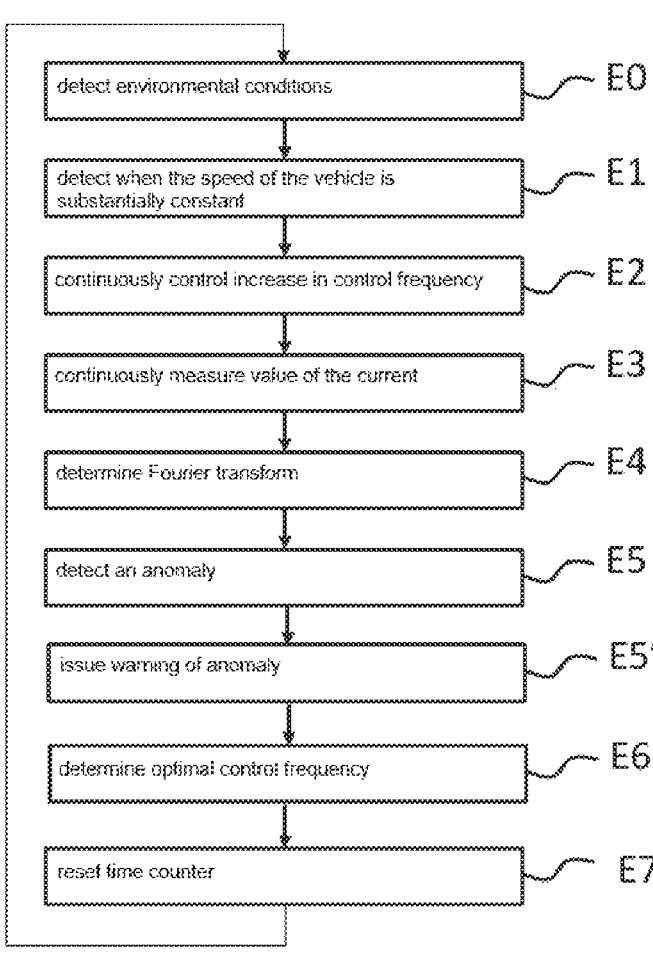
FIG. 3 is an illustration of the method according to an aspect of the invention.

An embodiment of the method according to the invention, implemented by the electric drive chain, and therefore by a control unit 30, as described above, will be described with reference to FIG. 3.

The method is implemented at a regular time interval. For example, the method is implemented weekly. To this end, the method is implemented from the time when the time counter has reached a predefined time threshold value. The value of the time threshold can designate a number of seconds, hours or days defining a week, for example.

In addition, the method can also comprise a preliminary phase E0 of detecting the environmental conditions for implementing the method correctly. For example, the environmental conditions relate to the temperature. An optimal temperature for implementing the method is defined between 15 and 30 degrees.

Constant Vehicle Speed Detection Step E1

The method firstly comprises a step E1 of detecting when the speed of the vehicle is substantially constant. The term "substantially constant speed" is understood, for example, to be a speed with a variation that is always minimal at a threshold over a predefined period of time. For example, during the detection step, a constant speed designates a speed variation of less than 10% over a 30 second period of time.

The remainder of the method is implemented after the detection step E1.

In addition, the method regularly comprises a step of checking the constancy of the speed. Indeed, the remainder of the method can only be carried out when the speed is substantially constant.

Frequency Control Step E2

The method also comprises a step E2 of continuously controlling the increase in the control frequency of the electric machine, in other words, the control frequency of the switches $I_{h1}$, $I_{h2}$, $I_{h3}$, $I_{l1}$, $I_{l2}$, $I_{l3}$ of each power circuit C1, C2, C3 of the inverter 20, from a minimum value to a maximum value.

The term "continuous" is understood to mean increasing the frequency by a predefined frequency step at regular time intervals, from the minimum value until the maximum value is reached.

For example, the switching frequency of the switches $I_{h1}$, $I_{h2}$, $I_{h3}$, $I_{l1}$, $I_{l2}$, $I_{l3}$ is controlled between 18 KHz and 22 KHz.

Current Measurement Step E3

The method then comprises a step E3 of continuously measuring the value of the current between the assembly comprising the battery 10 and the capacitor $C_{20}$ and between the inverter 20 during the control step E2.

The current variation thus measured as a function of the control frequency is then stored in the memory zone of the control module 30.

FFT Determination Step E4

The method then comprises a step E4 of determining the Fourier transform of the previously measured and stored current variation.

The Fourier transform as a function of the control frequency is then stored in the memory zone of the control module 30. Moreover, the memory zone also comprises a reference table associating a Fourier transform value interval with each control frequency value between the minimum value and the maximum value. Said interval defines the set of Fourier transform values corresponding to the nominal operation and without any breakdown of the drive chain, for a control frequency.

Analysis Phase

The method then comprises a phase of analyzing the Fourier transform thus obtained.

For each control frequency, the analysis phase comprises a step E5 of detecting an anomaly if at least one value of the determined Fourier transform is outside the interval of Fourier transform values associated with said control frequency.

The detected anomaly can be used to demonstrate the presence of an electronic malfunction on one of the electrical components of the inverter 20 and of the capacitor $C_{20}$ and/or a mechanical malfunction on one of said electrical components, notably a conductive wire that disengages from the resin in which it is attached and which vibrates.

Following the step E5 of detecting an anomaly, the method comprises a warning step E5', in which the control unit 30 issues the driver a warning in order to notify them of the anomaly, for example, by switching on an indicator light on the dashboard of the vehicle.

The analysis phase also comprises a step E6 of determining at least one optimal control frequency. To this end, the control unit 30 selects, from the previously determined Fourier transform and by omitting the control frequencies for which an anomaly has been detected, all the control frequencies with a Fourier transform value that is below a predefined threshold. The predefined threshold is previously stored in the memory zone. It is obvious that the control frequencies selected during this step must not correspond to control frequencies with a previously detected anomaly.

Finally, following the analysis phase, the method comprises a step E7 of resetting the value of the time counter to zero.

Notably, the method is repeated at the very least over at least two substantially different constant speeds. More preferably, the method is repeated over three different constant speeds.

The detected anomalies and the determined optimal control frequencies are compared between the various iterations of the method. If an anomaly is detected for the same control frequency between the various iterations of the method, then this allows the validity of the detected anomalies to be confirmed.

Similarly, if the value of an optimal control frequency is detected over the various iterations of the method, then this allows the validity of the detected optimal control frequency to be confirmed or denied.

The invention claimed is:

1. A method for electronically diagnosing an electric drive chain for an electric or hybrid motor vehicle, the drive chain comprising an electric battery, an electric machine, an inverter connected between the battery and the electric machine, and a link capacitor connected in parallel between the battery and the inverter, the diagnosis method comprising:

i) continuously controlling an increase in a control frequency of the electric machine from a minimum value to a maximum value;

ii) continuously measuring a value of a current between an assembly comprising the battery and the link capacitor and between the inverter during the continuously controlling step;

iii) determining the variation in a Fourier transform of a current variation as a function of the control frequency; and iv) for each increase in control frequency:

1) detecting an anomaly if at least one value of the Fourier transform is outside a predefined Fourier transform interval for said control frequency;

2) otherwise, determining when said control frequency value is optimal if the value of the Fourier transform for said control frequency is below a predefined threshold.

2. The method as claimed in claim 1, comprising, before the step of controlling the increase in the control frequency, a step of detecting when a speed of the vehicle is substantially constant.

3. The method as claimed in claim 2, wherein the minimum value of the control frequency ranges between 18.0 and 19.5 KHz and the maximum value of the control frequency ranges between 20.5 and 22.0 KHz.

4. The method as claimed in claim 1, wherein the minimum value of the control frequency ranges between 18.0 and 19.5 KHz and the maximum value of the control frequency ranges between 20.5 and 22.0 KHz.

5. The method as claimed in claim 1, the electric machine comprising at least two coils, the inverter comprising at least two power circuits, each power circuit comprising a first switch, called "high" switch, connected between the battery and a midpoint specific to said power circuit, and a second switch, called "low" switch, connected between the midpoint and ground, each power circuit being able to supply an alternating current at the respective midpoint, each power circuit being connected to a coil of the electric machine via the respective midpoint, each high switch and each low switch being characterized by a switching frequency, the continuously controlling the control frequency of the electric machine designating controlling the respective switching frequency of the switches of each power circuit of the inverter.

6. A control unit for an electric drive chain for an electric or hybrid motor vehicle, the drive chain comprising an electric battery, an electric machine, an inverter connected between the battery and the electric machine, and a link capacitor connected in parallel between the battery and the inverter, the electric machine comprising at least two coils, the inverter comprising at least three power circuits, each power circuit comprising a first switch, called "high" switch, connected between the battery and a midpoint specific to said power circuit, and a second switch, called "low" switch, connected between the midpoint and ground, each power circuit being able to supply an alternating current at the respective midpoint, each power circuit being connected to a coil of the electric machine via the respective midpoint, each high switch and each low switch being characterized by a switching frequency, the control unit being able to implement the method as claimed in claim 5.

7. A computer program product, comprising a set of program code instructions, which, when the program code instructions are executed by one or more processors, configure the one or more processors to implement a method as claimed in claim 1.

8. A control unit for an electric drive chain for an electric or hybrid motor vehicle, the drive chain comprising an electric battery, an electric machine, an inverter connected between the battery and the electric machine, and a link capacitor connected in parallel between the battery and the inverter, the control unit being able to implement the method as claimed in claim 1.

9. A motor vehicle comprising an electric drive chain, the drive chain comprising an electric battery, an electric machine, an inverter connected between the battery and the electric machine, a link capacitor connected in parallel between the battery and the inverter, and a control unit as claimed in claim 8.

* * * * *